April 4, 1961
F. G. HUFFMAN
2,978,276
HUB STRUCTURE
Filed Dec. 19, 1958
2 Sheets-Sheet 1
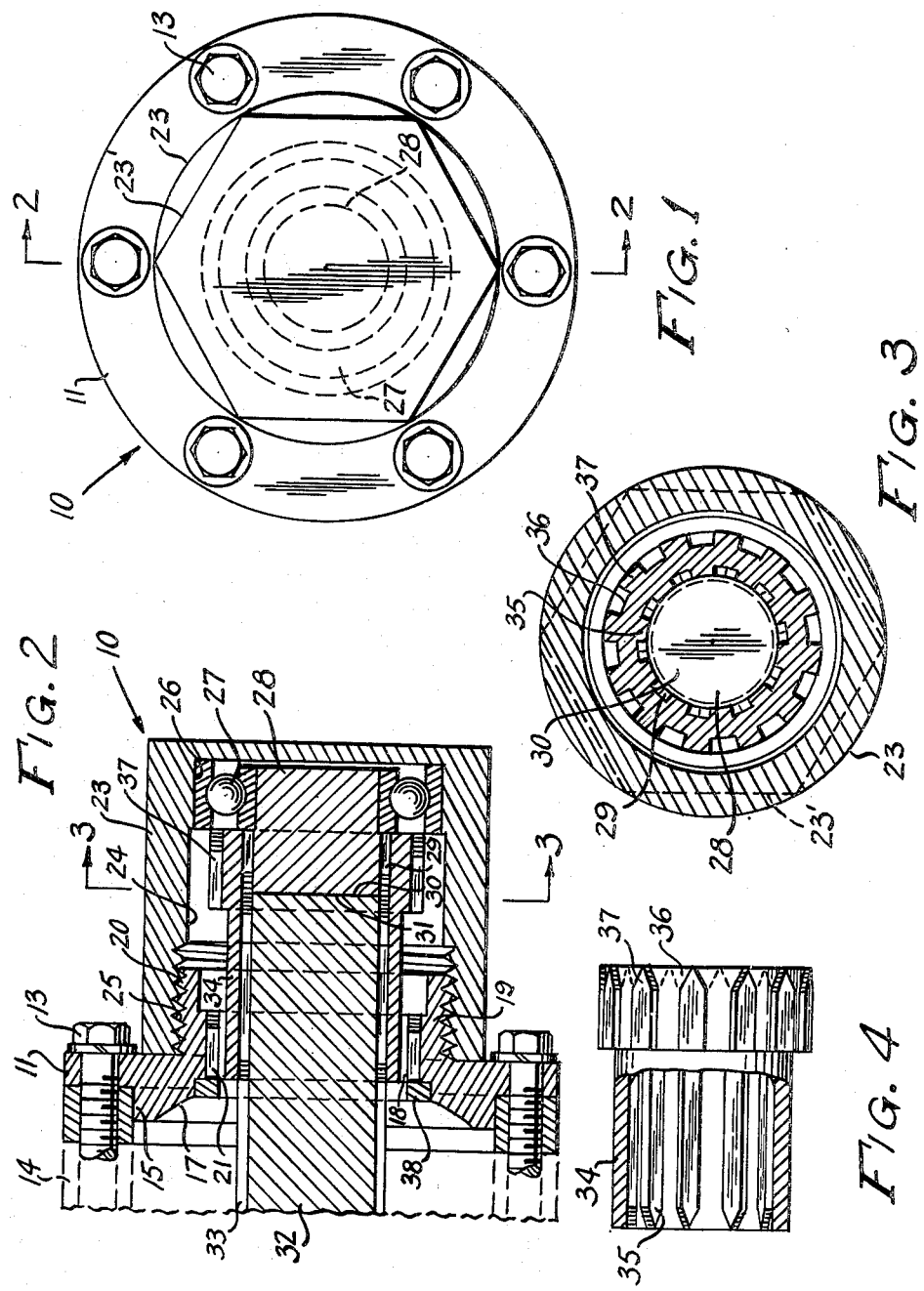
INVENTOR.
FLOYD G. HUFFMAN
BY
Patrick J. Beaver
Atty.

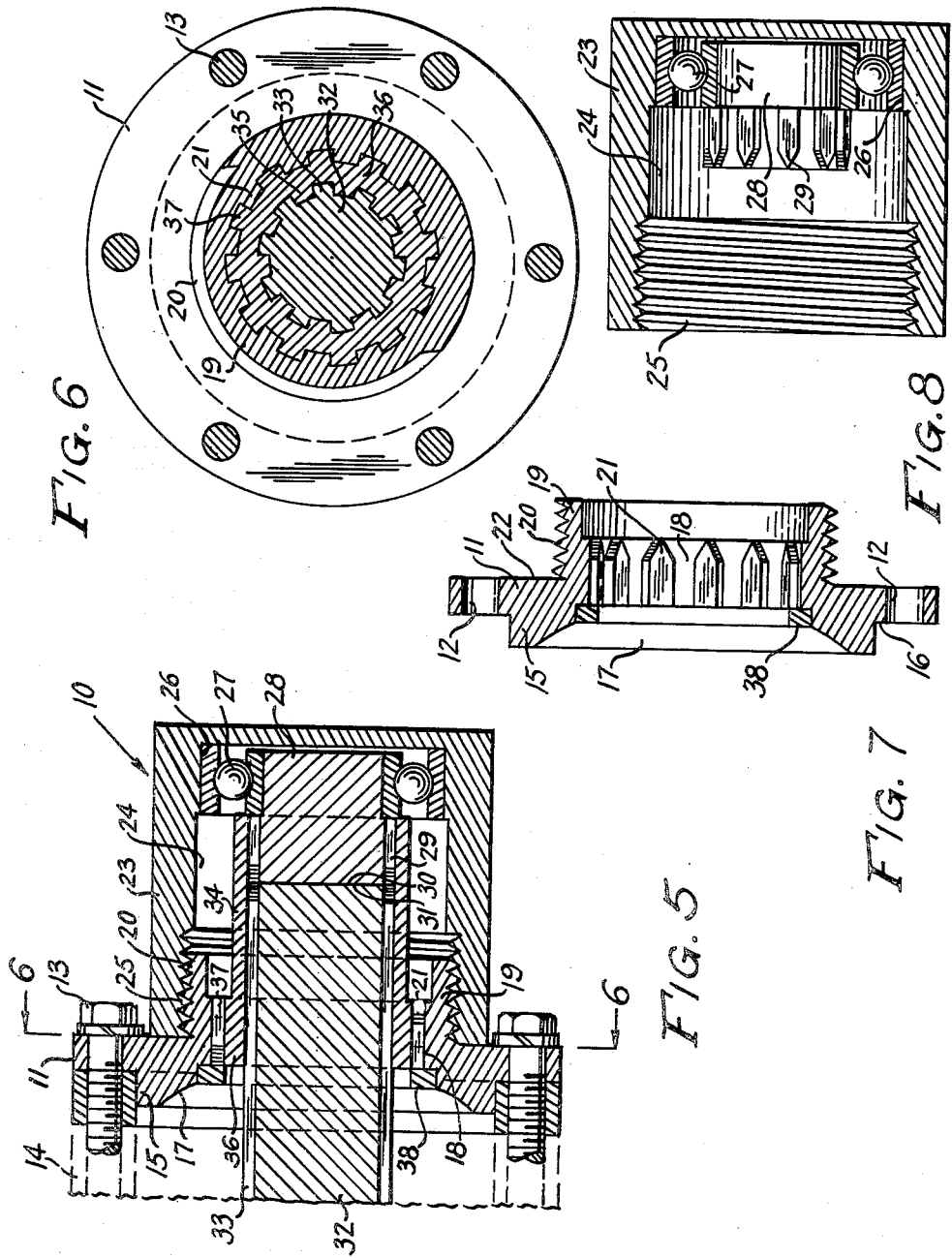

United States Patent Office 2,978,276
Patented Apr. 4, 1961

2,978,276
HUB STRUCTURE
Floyd G. Huffman, Durango, Colo.
(1040 Columbia Drive NE., Albuquerque, N. Mex.)
Filed Dec. 19, 1958, Ser. No. 781,542
8 Claims. (Cl. 301—1)

This invention relates to improvements in hub structures that are manually operated for free wheeling the front wheels of four wheel drive vehicles, when the vehicle is operated on paved or open roads and the four wheel drive has been disengaged.

In conventional four wheel drive vehicles, the front wheels are locked to the front driving axles in such a manner that the axles, ring gear, pinon and spider gears, bearings and drive lines to the transmission operate idly when the power has been disengaged.

It is an object, therefore, of this invention to provide a hub structure that can be simply and quickly manually operated to release the front wheels so that they will rotate freely on the axles without the necessity of having the gears etc. rotate simultaneously when the front wheel drive has been disengaged.

Another object of this invention is to provide a hub structure that is simple and rugged in construction, inexpensive to manufacture and can be quickly and easily converted from a free wheeling wheel to a driving wheel and vice versa.

With the above and other objects and advantages in view, the invention consists of the novel details of construction, arrangement and combination of parts more fully hereinafter described, claimed and illustrated in the accompanying drawings in which:

Fig. 1 is an elevational exterior view of a hub structure embodying the invention;

Fig. 2 is a vertical sectional view on the line 2—2 of Fig. 1;

Fig. 3 is a vertical sectional view on the line 3—3 of Fig. 2;

Fig. 4 is an elevational view, partly broken away and partly in section of a locking sleeve forming part of the invention;

Fig. 5 is a view similar to Fig. 2 with the locking sleeve in direct or locked position;

Fig. 6 is a vertical sectional view on the line 6—6 of Fig. 5;

Fig. 7 is a vertical sectional view of a hub plate forming part of the invention; and Fig. 8 is a vertical sectional view of a cap and stub shaft assembly forming a part of the invention.

Referring more in detail to the drawings, wherein like parts are designated by like reference numerals, the reference numeral 10 is used to generally designate a hub structure embodying the invention.

The hub 10 comprises a circular hub plate 11 that is provided with a plurality of bolt receiving openings 12 through which bolts 13 extend to secure the plate 11 to a conventional wheel hub 14, shown in dotted lines, Figs. 2 and 6. A circular shoulder 15, that is of a size to be received in the hub 14, is formed integral with the rear surface 16 of the plate 11. The shoulder 15 has an inwardly tapered recess 17 therein that communicates with the axle receiving opening 18 in the plate 11.

A circular pilot flange 19, having exterior threads 20, and internal pointed splines 21, is formed integral with the front face 22 of the plate 11 in alinement with the axle receiving opening 18.

A cylindrical shaped cap 23, having a hexagonal outer end 23' is provided with a circular recess 24 and internal threads 25 are provided in the cap 23 so that the cap may be screwed onto the threads 20 of the flange 19. A circular seat 26 of smaller diameter than the recess 24 is provided in the cap 23 in communication with the recess 24 and a roller bearing assembly 27 is positioned in the seat 26.

A pilot stub shaft 28 is press fitted into the roller bearing assembly 27 and the outer end of the shaft 28 is provided with pointed self-aligning splines 29.

When the cap 23 is screwed onto the flange 19 of the plate 11, the outer end 30 of the splined portion 29 of the stub shaft 28 will engage the outer end 31 of the conventional drive axle 32 that extends outwardly of the hub 14 through the opening 18 of the plate 11 and the axle is provided with splines 33.

The operation of the hub 10 depends on the manipulation of a locking sleeve 34, Fig. 4. The sleeve 34 is provided with internal splines 35 that are pointed at both ends and are self aligning with the splines 29 on the stub shaft 28 and the splines 33 on the axle 32.

An enlarged circular shoulder 36 is provided on one end of the sleeve 34 and external pointed splines 37 are provided on the outer surface of the shoulder 36.

This invention was developed to provide a hub cap structure that could be used to easily and quickly convert the front wheels of a four wheel drive vehicle from a driving wheel to freely rotating wheels and vice versa.

In order to perform such a conversion, the locking sleeve 34 may be positioned first as shown in Fig. 2. In this position the sleeve 34 is positioned so that the splines 35 therein will mesh with the splines 33 on the shaft 32. The sleeve 34 will then be slid forward until it engages a keeper washer 38 that is received in the recess 17. This places the splined shoulder 36 outwardly of the flange 19.

The cap 23 is then alined with the sleeve 34 so that the splined portion 29 will engage the splines 35 in the sleeve 34 and the threads 25 of the cap 23 is engaged with the threads 20 on the flange 19 and the cap 23 will be screwed tightly in place by means of a wrench engaging the hexagonal outer end 23' of the cap 23. The cap 23 will rotate freely by reason of the bearing 27.

In this position the wheel is free wheeling and will run free of the axle 32.

To place the wheels in drive condition the cap 23 is removed. The sleeve 34 is also removed and then reversed. The splines 37 on the portion 36 will now engage the splines 21 in the sleeve 19 and the splines 35 will again engage the splines 33 on the axle 32. The cap 23 is then replaced and the hub structure 10 will be assembled, as shown in Fig. 5.

There has thus been provided a hub structure that will prevent excessive wear on the driving parts of a four wheel drive vehicle when the four wheel drive has been disconnected from the front wheels and it is believed that the structure and operation of the invention will be apparent to those skilled in the art after a careful study of the foregoing description.

It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. In a vehicle including a splined axle, means for converting a wheel of the vehicle from a freely rotating wheel to a driving wheel and vice versa comprising a circular plate having an axle receiving opening therein secured to the wheel in circumjacent relation to the axle, means slidably mounted on the axle for fixing the plate to the axle in one position and disconnecting the plate from the axle in another position, a splined flange on said plate and the means for connecting and disconnecting the wheel from the axle is provided with internal splines to engage the axle and an external splined portion to selectively engage the splines in said flange and a cap secured to said plate and covering the outer end of the axle and said last said means, said cap being provided with a pilot stub axle having a splined portion thereon that is adapted to mesh with the internal splines in the means for connecting and disconnecting said plate from said axle.

2. The combination as in claim 1, wherein said plate is provided with an externally threaded flange and said cap is provided with internal threads to engage the threads on said flange to secure the cap to said plate.

3. The combination as in claim 1, wherein said cap is provided with a circular seat, a roller bearing is mounted in said seat and said stub axle is mounted in said roller bearing.

4. The combination as in claim 1, wherein said plate is provided with a circular shoulder that is received within the hub of the wheel.

5. The combination as in claim 1, wherein said plate is provided with spaced openings to receive bolts for securing said plate to the hub of the wheel.

6. The combination as in claim 1, wherein the means for connecting and disconnecting the wheel comprises a sleeve having internal splines to engage the splined axle, a smooth outer surface and a circular shoulder of greater diameter than said sleeve on one end thereof and external splines on the outer surface of said shoulder.

7. The combination as in claim 1, wherein said plate is of circular formation having spaced openings therein to receive securing means, an axle receiving opening centrally thereof, an annular flange communicating with said opening and having external threads thereon, and a circular shoulder communicating with said opening and having a tapered recess therein communicating with said opening.

8. The combination as in claim 1, wherein said cap is of cylindrical formation having a hexagonal shaped outer end, a circular recess therein, internal threads in said recess, a circular seat in said cap communicating with said recess, a roller bearing mounted in said seat and a stub axle having a splined portion thereon press fit into said bearing.

References Cited in the file of this patent

UNITED STATES PATENTS

| | | |
|---|---|---|
| 2,609,243 | Ponnequin | Sept. 2, 1952 |
| 2,788,103 | Requa | Apr. 9, 1957 |
| 2,821,277 | Hughes | Jan. 28, 1958 |
| 2,844,238 | Peterson | July 22, 1958 |
| 2,874,814 | Beck | Feb. 24, 1959 |